United States Patent
Beidas

(10) Patent No.: US 10,819,540 B2
(45) Date of Patent: Oct. 27, 2020

(54) RADIO FREQUENCY IMPAIRMENTS COMPENSATOR FOR BROADBAND QUADRATURE-CONVERSION ARCHITECTURES

(71) Applicant: Bassel F. Beidas, Germantown, MD (US)

(72) Inventor: Bassel F. Beidas, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 16/128,101

(22) Filed: Sep. 11, 2018

(65) Prior Publication Data
US 2020/0084068 A1  Mar. 12, 2020

(51) Int. Cl.
*H04L 25/03* (2006.01)
*H04B 1/04* (2006.01)

(52) U.S. Cl.
CPC ..... *H04L 25/03057* (2013.01); *H04B 1/0475* (2013.01); *H04B 2001/0433* (2013.01); *H04L 2025/03617* (2013.01)

(58) Field of Classification Search
CPC .... H04L 25/03057; H04L 2025/03617; H04B 1/10; H04B 1/0475; H04B 2001/0433; H04B 1/005–0089; H03D 7/18
See application file for complete search history.

(56) References Cited

U.S. PATENT DOCUMENTS

| | | | | |
|---|---|---|---|---|
| 6,289,048 B1* | 9/2001 | Richards | ................ | H04B 1/109 375/235 |
| 7,382,297 B1* | 6/2008 | Kopikare | ................ | H03C 5/00 341/118 |
| 7,733,949 B2* | 6/2010 | Jin | ................ | H04B 17/354 375/221 |
| 7,856,048 B1* | 12/2010 | Smaini | ................ | H04B 1/40 375/221 |
| 8,331,511 B2* | 12/2012 | Beidas | ................ | H04B 1/126 375/349 |
| 8,340,167 B2* | 12/2012 | Feng | ................ | H04B 17/21 375/226 |
| 8,467,438 B2* | 6/2013 | Beidas | ................ | H04L 25/03318 375/229 |

(Continued)

FOREIGN PATENT DOCUMENTS

WO  2014043600 A1  3/2014

OTHER PUBLICATIONS

International search report Application No. PCT/US2019/049365.

*Primary Examiner* — James M Perez
(74) *Attorney, Agent, or Firm* — Capitol City Techlaw; Jasbir Singh

(57) ABSTRACT

A Radio Frequency Impairments (RFI) compensator and a process to remove RFI is disclosed. The RFI compensator including: a conjugator to conjugate a signal $\tilde{x}[n]$ to provide a signal $\tilde{x}^*[n]$; and a filter to apply coefficients that equalize a linear distortion of the signal $\tilde{x}[n]$ and reject an interfering image of the signal $\tilde{x}^*[n]$. The signal $\tilde{x}[n]$ may be a single wideband carrier or may include multiple carriers at different carrier frequencies.

14 Claims, 8 Drawing Sheets

(56) References Cited

U.S. PATENT DOCUMENTS

| | | | | |
|---|---|---|---|---|
| 8,831,550 B2* | 9/2014 | Chang | H03C 5/00 | 455/307 |
| 8,867,601 B2* | 10/2014 | Beidas | H04L 27/2647 | 375/232 |
| 8,912,848 B2* | 12/2014 | Lee | H03F 1/3247 | 330/149 |
| 8,971,465 B2* | 3/2015 | Varanese | H04L 27/3863 | 375/346 |
| 9,106,471 B2* | 8/2015 | Patel | H04L 27/3863 | |
| 9,184,975 B1* | 11/2015 | Liou | H04L 27/3863 | |
| 9,197,268 B1* | 11/2015 | Petrovic | H04L 27/06 | |
| 9,231,633 B1* | 1/2016 | Petrovic | H04B 1/30 | |
| 9,252,821 B2* | 2/2016 | Shor | H04L 25/03853 | |
| 9,325,553 B2* | 4/2016 | Kaukovuori | H04B 1/30 | |
| 9,577,588 B1* | 2/2017 | Beidas | H04L 27/368 | |
| 9,628,119 B2* | 4/2017 | Gal | H03F 1/3241 | |
| 9,780,891 B2* | 10/2017 | Eo | H04B 17/0085 | |
| 9,893,924 B2* | 2/2018 | Smail | H04L 27/265 | |
| RE46,868 E* | 5/2018 | Choi | H04L 1/005 | |
| 10,014,914 B1* | 7/2018 | Becker | H04L 27/34 | |
| 10,033,413 B2* | 7/2018 | Pratt | H03F 1/3294 | |
| 10,075,201 B1* | 9/2018 | Gazneli | H03F 1/3258 | |
| 10,230,409 B2* | 3/2019 | Becker | H04B 1/1027 | |
| 10,439,851 B2* | 10/2019 | Novak | H04B 7/0837 | |
| 10,484,108 B1* | 11/2019 | Al-Qaq | H04B 17/12 | |
| 10,594,535 B2* | 3/2020 | Jong | H04L 1/20 | |
| 2003/0171110 A1* | 9/2003 | Shi | H04B 1/406 | 455/324 |
| 2003/0206603 A1* | 11/2003 | Husted | H04L 27/3863 | 375/324 |
| 2005/0014475 A1* | 1/2005 | Kim | H04L 27/0014 | 455/115.1 |
| 2005/0041754 A1* | 2/2005 | Wu | H04L 27/364 | 375/295 |
| 2005/0069050 A1* | 3/2005 | Ding | H03C 3/40 | 375/296 |
| 2006/0034356 A1* | 2/2006 | Fechtel | H03D 3/009 | 375/219 |
| 2006/0056546 A1* | 3/2006 | Hayase | H03D 7/163 | 375/332 |
| 2006/0256216 A1* | 11/2006 | Takahiko | H03D 3/007 | 348/264 |
| 2006/0281429 A1* | 12/2006 | Kishi | H04B 1/30 | 455/313 |
| 2008/0187038 A1* | 8/2008 | Currivan | H04L 27/0014 | 375/233 |
| 2009/0227215 A1* | 9/2009 | McCallister | H03F 1/0211 | 455/114.3 |
| 2010/0183106 A1* | 7/2010 | Beidas | H04L 25/03038 | 375/350 |
| 2010/0302083 A1* | 12/2010 | Helfenstein | H04L 27/364 | 341/118 |
| 2010/0330947 A1* | 12/2010 | Khoury | H04B 1/28 | 455/302 |
| 2012/0027070 A1* | 2/2012 | Beidas | H04L 25/067 | 375/229 |
| 2012/0177151 A1* | 7/2012 | Hormis | H04L 27/3863 | 375/340 |
| 2012/0288026 A1* | 11/2012 | Wang | H04B 1/0475 | 375/285 |
| 2013/0195152 A1* | 8/2013 | Muhammad | H04B 17/11 | 375/219 |
| 2013/0259153 A1* | 10/2013 | Varanese | H04L 27/2647 | 375/295 |
| 2013/0272367 A1* | 10/2013 | Beidas | H04L 25/03171 | 375/232 |
| 2013/0279560 A1* | 10/2013 | Currivan | G06F 1/3215 | 375/233 |
| 2014/0086361 A1* | 3/2014 | Azadet | H04L 25/4917 | 375/297 |
| 2014/0177761 A1* | 6/2014 | Patel | H04L 27/06 | 375/340 |
| 2014/0199068 A1* | 7/2014 | Kaneda | H04B 10/614 | 398/65 |
| 2014/0270002 A1* | 9/2014 | Schubert | H04L 1/0045 | 375/320 |
| 2014/0317163 A1* | 10/2014 | Azadet | H04L 27/367 | 708/420 |
| 2016/0191020 A1* | 6/2016 | Velazquez | H03H 21/0067 | 341/118 |
| 2017/0070196 A1* | 3/2017 | Beidas | H03F 3/24 | |
| 2017/0346507 A1* | 11/2017 | Becker | H04B 7/0854 | |
| 2018/0175978 A1* | 6/2018 | Beidas | H04L 5/001 | |
| 2018/0242269 A1* | 8/2018 | Gou | H04L 27/364 | |
| 2019/0097866 A1* | 3/2019 | Sestok, IV | H04L 27/3863 | |
| 2019/0372819 A1* | 12/2019 | Jong | H04L 27/2669 | |
| 2020/0084068 A1* | 3/2020 | Beidas | H04L 25/03057 | |

* cited by examiner

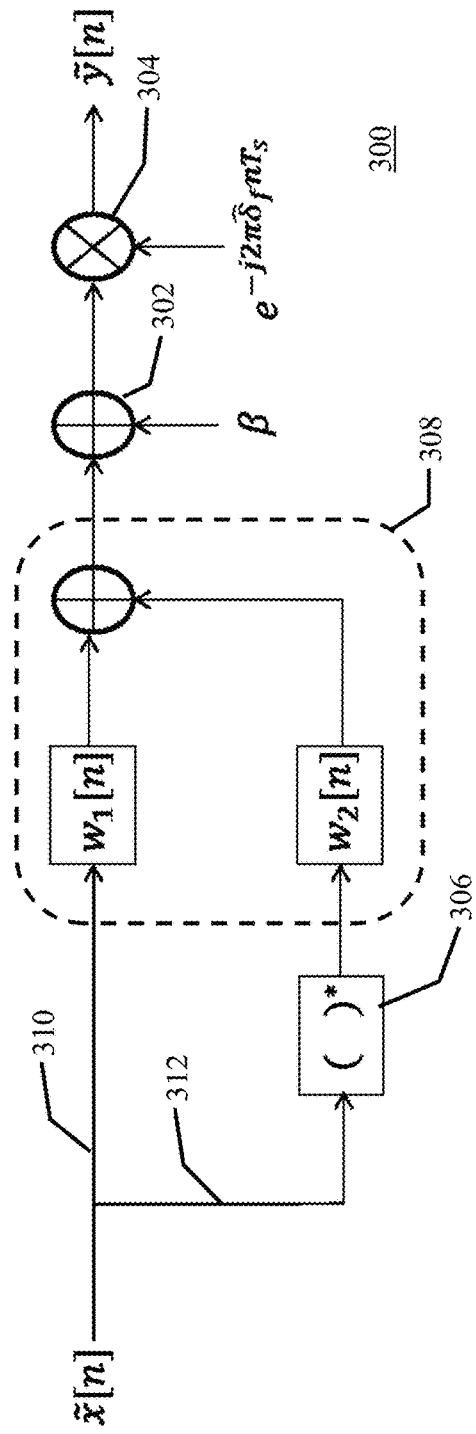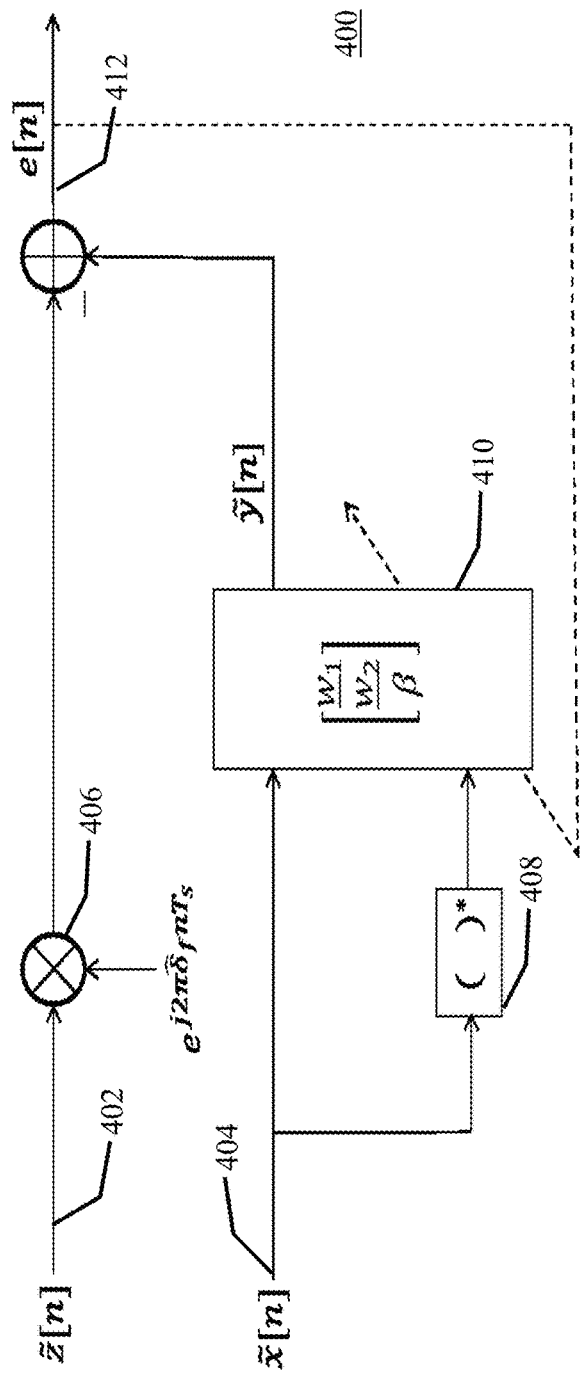

| Case | Es/No (dB) | MSE (dB) | MSE (dB) With IQI Compensation |
|---|---|---|---|
| $h_I[n]$ and $h_Q[n]$; $g = 1.15$; $\varphi = 10°$; $\alpha_{dc,I} = 0$; $\alpha_{dc,Q} = 0$; | 15.00 | -13.17 | -15.00 |
| $h_I[n]$ and $h_Q[n]$; $g = 1.15$; $\varphi = 10°$; $\alpha_{dc,I} = 0.05$; $\alpha_{dc,Q} = -0.05$; | 15.00 | -12.85 | -15.00 |
FIG. 9
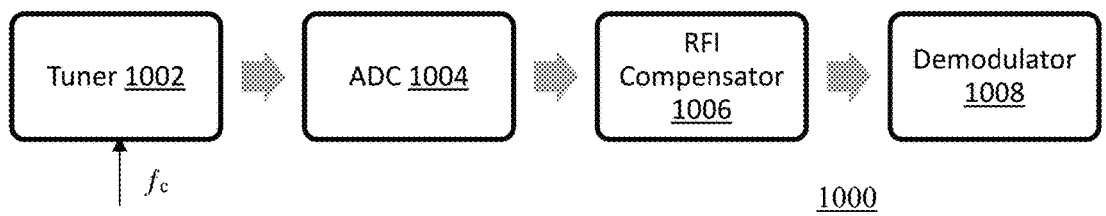
FIG. 10
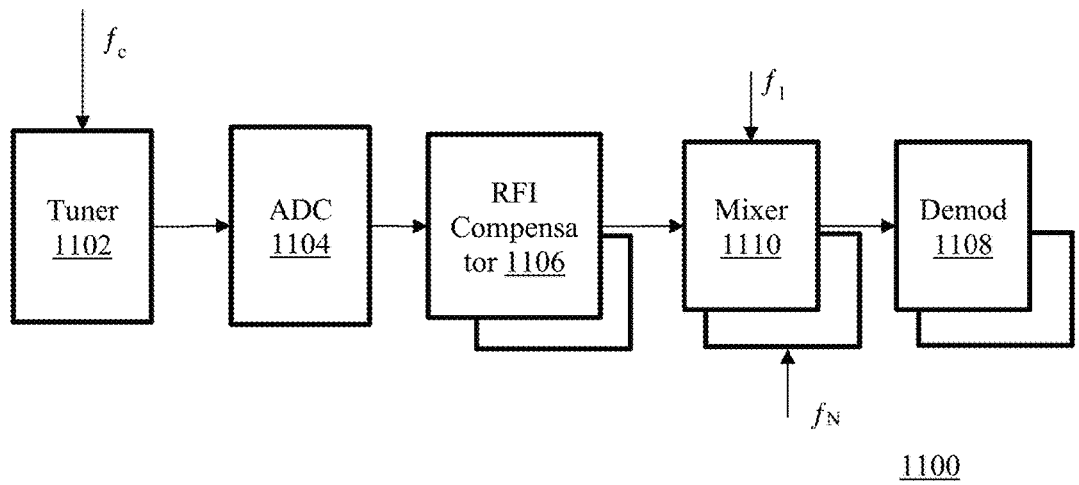
FIG. 11A

RADIO FREQUENCY IMPAIRMENTS COMPENSATOR FOR BROADBAND QUADRATURE-CONVERSION ARCHITECTURES

FIELD

A system and method to jointly suppress a Direct Current (DC) offset and remove radio-frequency (RF) impairments encountered in quadrature-conversion is disclosed. The method and system cope particularly well with strong in-phase/quadrature (IQ) imbalance that is frequency-selective in broadband applications, while tolerating frequency error between mixers at a transmitter and a receiver. The method and system are effective for a single wideband carrier signal or a signal including multiple carriers at different carrier frequencies. Moreover, the system and method are adaptive and do not require a priori knowledge about the RF impairments impulse response.

BACKGROUND

A quadrature frequency conversion architecture is used in modern communications systems. It is responsible for a frequency translation, up at the transmitter-side and down at the receiver-side, between a baseband and the Radio Frequency (RF) of a carrier. Special cases of quadrature-conversion architectures include zero-Intermediate Frequency (IF) and low-IF converters. Analog elements are used for frequency conversion to implement mixers, filters, amplifiers, and oscillators. However, the imperfections and finite tolerance of analog elements induce mismatch between the in-phase/quadrature (IQ) branches of the converters.

A mismatch between the phase and gain of the IQ mixer arms creates imbalance that is constant over the signal band. The mismatch between the analog anti-aliasing filters in the IQ arms causes an imbalance that is frequency-selective. Also, there can exist a Direct-Current (DC) offset on each arm resulting from the Local Oscillator (LO) leakage. The presence of In-phase Quadrature Imbalance (IQI) and DC offset significantly degrades system performance.

This problem is worse when wideband signals with high-order modulations are used. Maintaining match of anti-aliasing filters over a wide range of frequencies is very difficult in the analog domain. The difficulties increase the cost of manufacture and cause delays in chip design time. As such, the problem of frequency-selective IQI that is strong and has large memory span needs to be addressed effectively in next-generation communications systems.

FIG. 1 illustrates a prior art quadrature-conversion system operating on a bandpass input r(t) and providing an output x(t).

The output x(t) includes imperfections from the analog RF elements, such as $h_I(t)$ and $h_Q(t)$. A mismatch in a gain g and a phase $\varphi$ between an in-phase arm and a quadrature arm of a LO mixer induce a frequency-independent IQ imbalance, whereas the mismatch between the analog anti-aliasing filters $h_I(t)$ and $h_Q(t)$ contribute to frequency-selective IQ imbalance. The filter h(t) is common to the two paths. For broadband systems, the difference between these anti-aliasing filters $h_I(t)$ and $h_Q(t)$ in each of the IQ arms becomes significant as it is difficult to maintain a match over a large frequency range in the analog domain. The LO carrier leakage induces a DC offset $\alpha_{DC,I}$ and $\alpha_{DC,Q}$ in each arm separately. Furthermore, there is an unavoidable frequency error, denoted as $\delta_f$, between the mixers placed at the transmitter and the receiver. The frequency error harms performance if not addressed properly.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings, jointly or singly, suppress the DC offset and remove an imbalance encountered in quadrature-conversion systems, coping particularly well with in-phase/quadrature (IQ) imbalance that is strong and frequency-selective in broadband applications. This is done while tolerating frequency error that exists between mixers placed at a transmitter and a receiver. The present teachings are adaptive and do not depend upon a priori knowledge about an RF impairments impulse response. In some embodiments, the present teachings operate as data-aided initially, for example, at the factory. In some embodiments, the present teachings operate in decision-directed mode, for example, during normal operation without requiring training data at or from a gateway. In some embodiments, a computation of the coefficients for the compensation scheme is done iteratively without requiring any matrix inversion, as matrix inversion is computationally cumbersome and may introduce performance instability. In some embodiments, the coefficients are computed directly without requiring transformation between time and frequency domains. This may reduce computational needs. Significant gains are demonstrated when compared with systems that do not use the present teachings.

A Radio Frequency Impairments (RFI) compensator is disclosed. The RFI compensator including: a conjugator to conjugate a signal $\tilde{x}[n]$ to provide a signal $\tilde{x}^*[n]$; and a filter to apply coefficients that equalize a linear distortion of the signal $\tilde{x}[n]$, and reject an interfering image of the signal $\tilde{x}^*[n]$.

A process to compensate for Radio Frequency Impairments (RFI) is disclosed. The process including: conjugating a signal $\tilde{x}[n]$ to provide a signal $\tilde{x}^*[n]$; and filtering by applying coefficients that equalize a linear distortion of the signal $\tilde{x}[n]$ and reject an interfering image of the signal $\tilde{x}^*[n]$.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

FIG. 3 illustrates an RFI compensator in normal operation mode according to various embodiments.

FIG. 4 illustrates an RFI compensator in training operation mode according to various embodiments.

FIG. 9 illustrates a simulated Mean Squared Error (MSE) at $E_s/N_0=15$ dB with and without an RFI compensator according to various embodiments.

FIG. 10 illustrates a signal demodulation including an RFI compensator according to various embodiments.

FIG. 11A illustrates a multi-carrier signal demodulation including a plurality of RFI compensators according to various embodiments.

Figure 1:
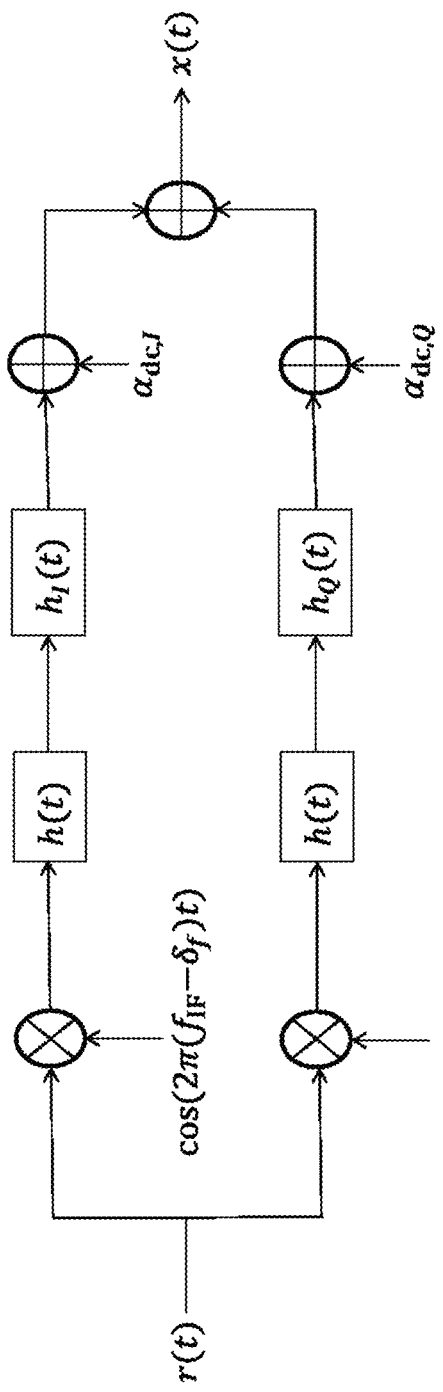
FIG. 1 illustrates a prior art quadrature-conversion system operating on a bandpass input r(t) and providing an output x(t).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings achieve a high data rate in broadband communication systems while using cost-effective integrated quadrature-conversion for frequency translation between baseband and radio frequency (RF), and vice versa. The present teachings compensate for residual impairments induced by imperfections of analog RF components. In some embodiments the present teachings address a strong frequency-selective IQ imbalance having a large time span. The frequency selective In-phase/Quadrature (IQ) imbalance occurs as maintaining a match of anti-aliasing filters in the IQ branches of a converter over a wide range of frequencies is very difficult and costly in the analog domain. The present teachings can tolerate the unavoidable frequency error of RF mixers.

Figure 2:
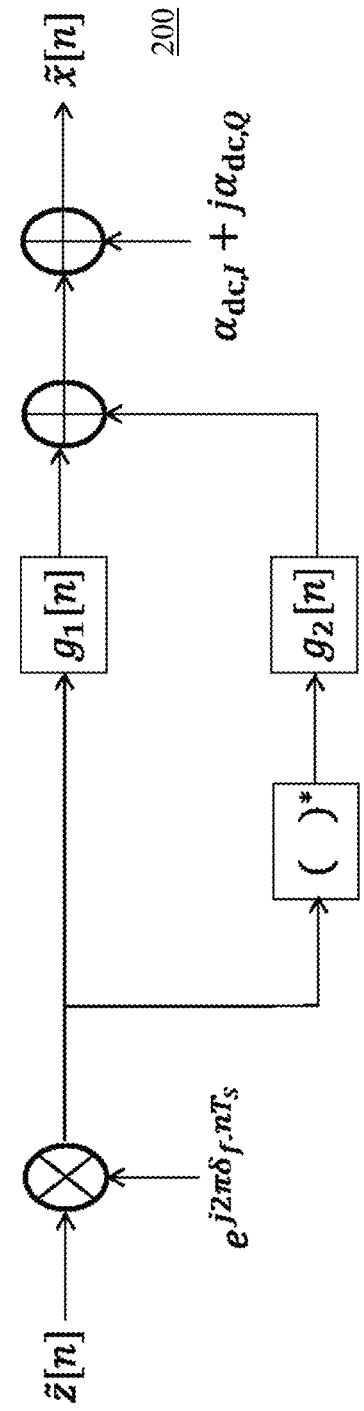
FIG. 2 illustrates a baseband model of a quadrature conversion channel with Radio Frequency Impairments (RFI) according to various embodiments.

FIG. 2 illustrates a baseband model of a quadrature conversion channel with Radio Frequency Impairments (RFI) according to various embodiments.

Let $\tilde{z}[n]$ be the discrete-time baseband representation of the input signal without imperfections and let $\tilde{x}[n]$ be the discrete-time baseband signal that includes RF impairments such as IQ imbalance, frequency-independent and frequency-selective, a DC offset and frequency error. A mathematical derivation (not shown) provides that $\tilde{x}[n]$ is given as (* denotes convolution, superscript (.)* denotes conjugation):

$$\tilde{x}[n]=g_1[n]*(\tilde{z}[n]\cdot e^{j2\pi\delta fnT_s})+g_2[n]*(\tilde{z}[n]\cdot e^{j2\pi\delta fnT_s})^*+(\alpha_{DC,I}+j\alpha_{DC,Q})$$

$$g_1[n]=h[n]*(h_I[n]+h_Q[n]\cdot g\cdot e^{-j\varphi})/2$$

$$g_2[n]=h[n]*(h_I[n]-h_Q[n]\cdot g\cdot e^{+j\varphi})/2$$

FIG. 2 illustrates a discrete-time baseband model 200 of a signal with RF impairments that are induced by quadrature-conversion system of the prior art (see FIG. 1). In FIG. 2, a filter $g_1[n]$ represents and RF impairments impulse response associated with a signal $\tilde{z}[n]$; whereas a filter $g_2[n]$ represents in RF impairments impulse response associated with a interfering mirror image $\tilde{z}^*[n]$ of signal $\tilde{z}[n]$. The baseband model 200 suggests the teachings disclose herein.

FIG. 3 illustrates an RFI compensator in a normal operation mode according to various embodiments.

FIG. 3 illustrates a compensator 300. Let $\tilde{x}[n]$ be a discrete-time baseband signal that includes RF impairments such as IQ imbalance, frequency-independent and frequency-selective, a DC offset and frequency error. The compensator 300 includes two arms. A first arm 310 involves the signal $\tilde{x}[n]$ and a second arm 312 involves a mirror image of signal $\tilde{x}[n]$, $\tilde{x}^*[n]$ resulting from a conjugation. A conjugator 306 may provide $\tilde{x}^*[n]$. The filters 308 apply coefficients $w_1[n]$ and $w_2[n]$ to equalize a linear distortion in the signal $\tilde{x}[n]$ and to simultaneously reject the interfering mirror image $\tilde{x}^*[n]$ respectively. An adder 302 adds a complex term $\beta$ to an output of the filters 308 to suppress a DC offset. Further, a complex mixer 304 is then applied to remove a frequency error. The filters $w_1[n]$ and $w_2[n]$, the complex term $\beta$ are unknown and calculated as illustrated in exemplary FIG. 4. In some embodiments, an estimated frequency error, $e^{j2\pi\hat{\delta}_f nT_s}$, is assumed and applied. In exemplary embodiments, the signal $\tilde{x}[n]$ may be the output of an analog to digital converter (not shown) at a receiver. In exemplary embodiments, the output of the mixer $\tilde{y}[n]$ may be provided to a demodulator (not shown) at a receiver.

In exemplary embodiments, the filter $w_1[n]$ is not present and filter $w_2[n]$ incorporates the inverse of $g_1[n]$. This assumes that filter $g_1[n]$ is known, and a mapping between time and frequency domains to provide the inverse and demands higher number of filter taps for its implementation, as the inverse is in principle an Infinite-Impulse Response (IIR) filter. In addition, this may leave a residual intersymbol interference in the signal $\tilde{y}[n]$ that may be removed later in the demodulation chain.

FIG. 4 illustrates an RFI compensator in training operation mode according to various embodiments.

A compensator 400 can compute filter coefficients and DC offset suppression term. The computation of the filter coefficients and DC offset suppression term, i.e., $w_1[n]$, $w_2[n]$, and $\beta$, is performed by a stochastic gradient-based technique that may iteratively arrive at the solution without a priori knowledge of the RF impairment parameters. In some embodiments the computation may avoid using a matrix inversion technique.

In some embodiments, the coefficients are estimated jointly to drive the RF impairments toward zero in a least-squares sense. To this end, a stacked construction is used in forming the vector c by stacking vectors relating to the filter coefficients and DC-offset parameter as $$\underline{c} = \begin{bmatrix} \underline{w}_1 \\ \underline{w}_2 \\ \beta \end{bmatrix},$$

as where $\underline{w}_1 = [w_1[0], w_1[1], \ldots, w_1[L_1-1]]^T$ and $\underline{w}_2 = [w_2[0], w_2[1], \ldots, w_2[L_2-1]]^T$ are the coefficients for the signal and mirror-image filters with memory span $L_1$ and $L_2$, respectively. The corresponding input vector to the compensator 400 is $$\underline{\tilde{x}}[n] = \begin{bmatrix} \underline{\tilde{x}}_1[n] \\ \underline{\tilde{x}}_2[n] \\ 1 \end{bmatrix}$$

where $\underline{\tilde{x}}_1[n] = [\tilde{x}[n], \tilde{x}[n-1], \ldots, \tilde{x}[n-L_1+1]]^T$ and $\underline{\tilde{x}}_2[n] = [\tilde{x}^*[n], \tilde{x}^*[n-1], \ldots, \tilde{x}^*[n-L_2+1]]^T$. The output of the stacked construction is mathematically expressed as $\tilde{y}[n] = \underline{c}^T \cdot \underline{\tilde{x}}[n]$.

In exemplary embodiments, the present teachings and compensator 400 address the frequency offset in training mode. As shown in FIG. 4, an input signal 404 $\tilde{x}[n]$ and a known or reference signal 402 $\tilde{z}[n]$ can be used to determine an error signal 412 $e[n]$. A conjugator 408 may provide a signal $\tilde{x}^*[n]$.

The known signal 402 represents a baseband signal with no IQ imbalance. The known signal 402 is modified by a complex mixer 406 $e^{j2\pi\hat{\delta}_f nT_s}$ to experience similar phase rotation as the input signal 404. If not addressed properly, a frequency error creates a mismatch between the imbalance channel that is trained for versus that to which it is applied, thus harming performance. In exemplary embodiments, an estimate of the frequency error $e^{j2\pi\hat{\delta}_f nT_s}$ may be obtained by sending a test tone through the imbalance channel and then extracting the estimate as the slope of the best line formed by the phase measurements.

The error signal $\tilde{e}[n]$ can then be calculated based on an output of the complex mixer 406 and a stacked output as $$\tilde{e}[n] = \tilde{z}[n] \cdot e^{j2\pi\hat{\delta}_f \cdot nT_s} - \tilde{y}[n]$$
$$= \tilde{z}[n] \cdot e^{j2\pi\hat{\delta}_f \cdot nT_s} - \underline{c}^T \cdot \underline{\tilde{x}}[n]$$

Exemplary techniques that can be utilized in a coefficient calculator 410 to adaptively compute coefficients $\underline{c}$ to minimize the error signal $\tilde{e}[n]$ include the Least Mean-Squares (LMS) and the Recursive Least-Squares (RLS). In some embodiments, the RLS may provide faster convergence and achieve performance that is somewhat independent of the input signal statistics. In exemplary embodiments, the coefficient calculator 410 may iteratively compute, without requiring any matrix inversion, the coefficients $\underline{c}$ by compensation schemes, whether via LMS or RLS. The matrix inversion is computationally cumbersome and may introduce performance instability.

When using the LMS criterion, the coefficient calculator 410 computes coefficients iteratively as $\underline{c}[n+1] = \underline{c}[n] + \mu \cdot \underline{\tilde{x}}[n] \cdot \tilde{e}^*[n]$, where $\mu$ is a small number chosen to adjust an adaptation speed.

When using the RLS criterion, the coefficient calculator 410 computes coefficients the iteratively as $\underline{c}[n+1] = \underline{c}[n] + \underline{k}[n] \cdot \tilde{e}^*[n]$, where $\lambda$ is the forgetting factor, $0 < \lambda \leq 1$, $$\underline{k}[n] = \frac{\lambda^{-1} \cdot P[n-1] \cdot \underline{\tilde{x}}[n]}{1 + \lambda^{-1} \cdot \underline{\tilde{x}}^H[n] \cdot P[n-1] \cdot \underline{\tilde{x}}[n]},$$

and $$P[n] = \lambda^{-1} \cdot P[n-1] - \lambda^{-1} \cdot \underline{k}[n] \cdot \underline{\tilde{x}}^H[n] \cdot P[n-1]$$

Performance Studies

Extensive simulations were implemented to evaluate the performance of the present teachings. The simulation setup used a highly efficient broadband satellite application with high symbol rate of about 1 Giga-Baud (GBaud) and data modulation that was high-order, based on 32-ary amplitude phase-shift keying (32-APSK) constellation from the DVB-S2 and DVB-S2X standard. A pair of Root-Raised Cosine (RRC) filters with a roll off factor of 0.05 served as interpolation and decimation filters. The distortion was quantified in terms of the Mean Squared Error (MSE) between the received samples and the underlying constellations.

Figure 5A:
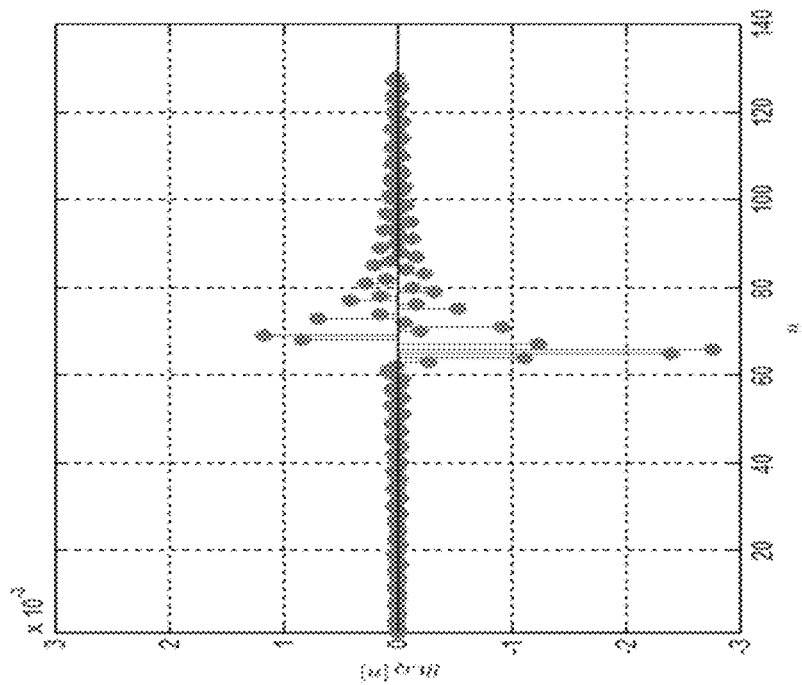
FIG. 5A illustrates real part of an impulse response of an RFI channel $g_1[n]$ associated with a received signal according to various embodiments.
Figure 5B:
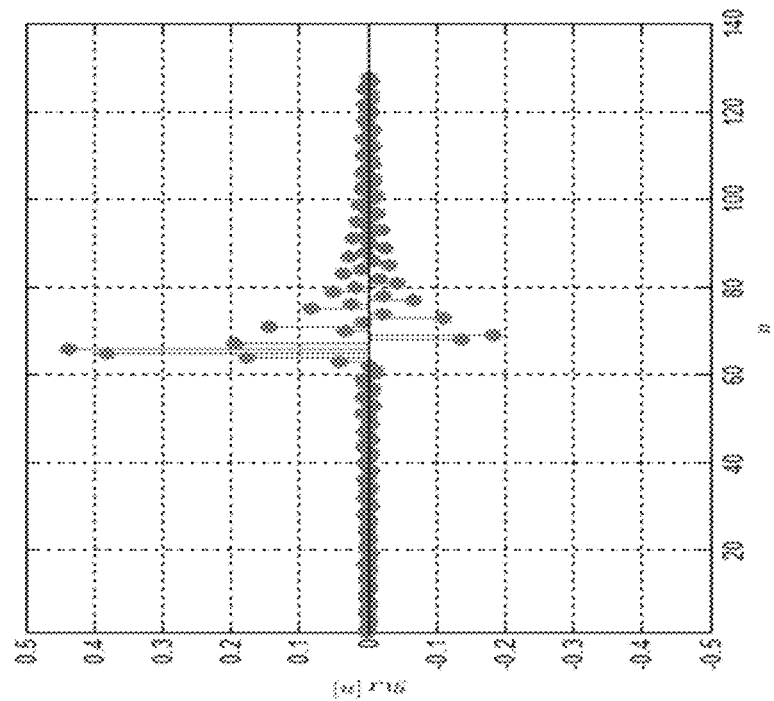
FIG. 5B illustrates imaginary part of an impulse response of an RFI channel $g_1[n]$ associated with a received signal according to various embodiments.
Figure 6A:
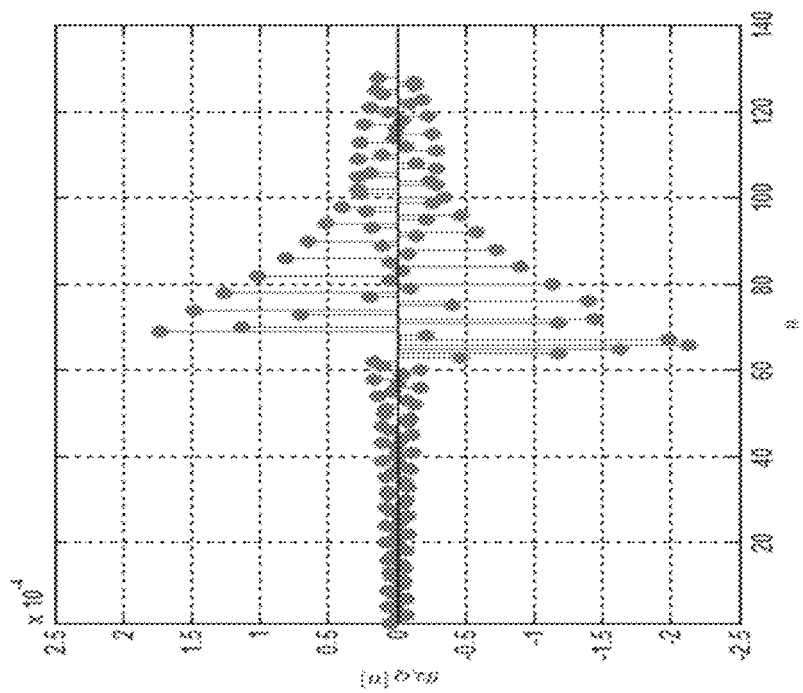
FIG. 6A illustrates real part of an impulse response of an RFI channel $g_2[n]$ associated with image of a received signal according to various embodiments.
Figure 6B:
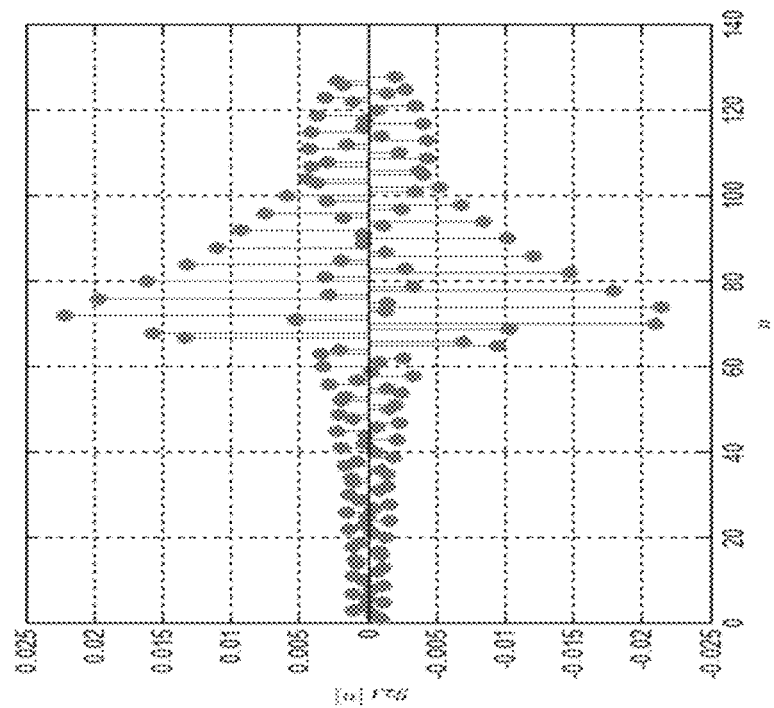
FIG. 6B illustrates imaginary part of an impulse response of an RFI channel $g_2[n]$ associated with image of a received signal according to various embodiments.

FIG. 5A illustrates real part of an impulse response of an RFI channel $g_1[n]$ associated with a received signal according to various embodiments. FIG. 5B illustrates imaginary part of an impulse response of an RFI channel $g_1[n]$ associated with a received signal according to various embodiments. FIG. 6A illustrates real part of an impulse response of an RFI channel $g_2[n]$ associated with image of a received signal according to various embodiments. FIG. 6B illustrates imaginary part of an impulse response of an RFI channel $g_2[n]$ associated with image of a received signal according to various embodiments.

In the analog domain, a zero-IF quadrature down-conversion was used to produce digital samples at a rate of 2 Gigahertz (GHz). The analog anti-aliasing filters $h_I(t)$ and $h_Q(t)$ were based on $6^{th}$-order Butterworth criterion with a double-sided bandwidth of 1 GHz. The mismatch between these analog filters induces frequency-selective IQ imbalance whose impulse responses are shown in FIG. 5A and FIG. 5B for $g_1[n]$ and in FIG. 6A and FIG. 6B for $g_2[n]$. These figures illustrate that an induced frequency-selective imbalance channel for high data rates is strong and has a large time span.

The simulation environment included a frequency error $\delta_f$ of 200 Kilohertz (KHz) during training and 4 Megahertz (MHz) during normal operation. The static gain and phase imbalance values, g and φ, were 1.15 and 10°, respectively. Also, the DC-offset values injected for $\alpha_{DC,I}$ and $\alpha_{DC,Q}$ were 0.05 and −0.05, respectively.

Figure 7:
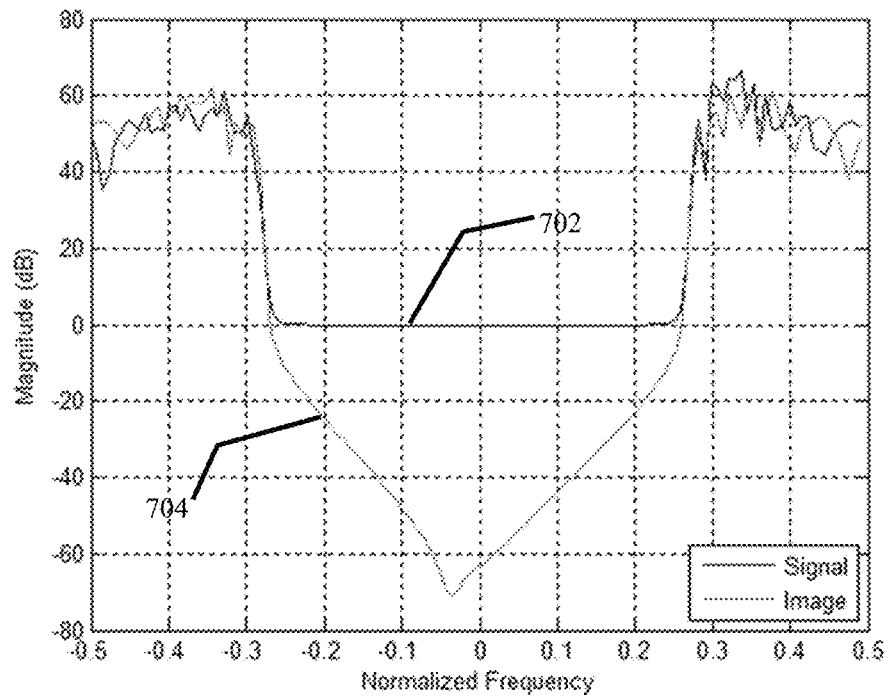
FIG. 7 illustrates a representative transfer function of compensation filters $w_1[n]$ and $w_2[n]$ at the end of training for a RFI compensator according to various embodiments.

FIG. 7 illustrates a representative transfer function of the compensation filters $w_1[n]$ and $w_2[n]$ at the end of training for a RFI compensator according to various embodiments.

Figure 12:
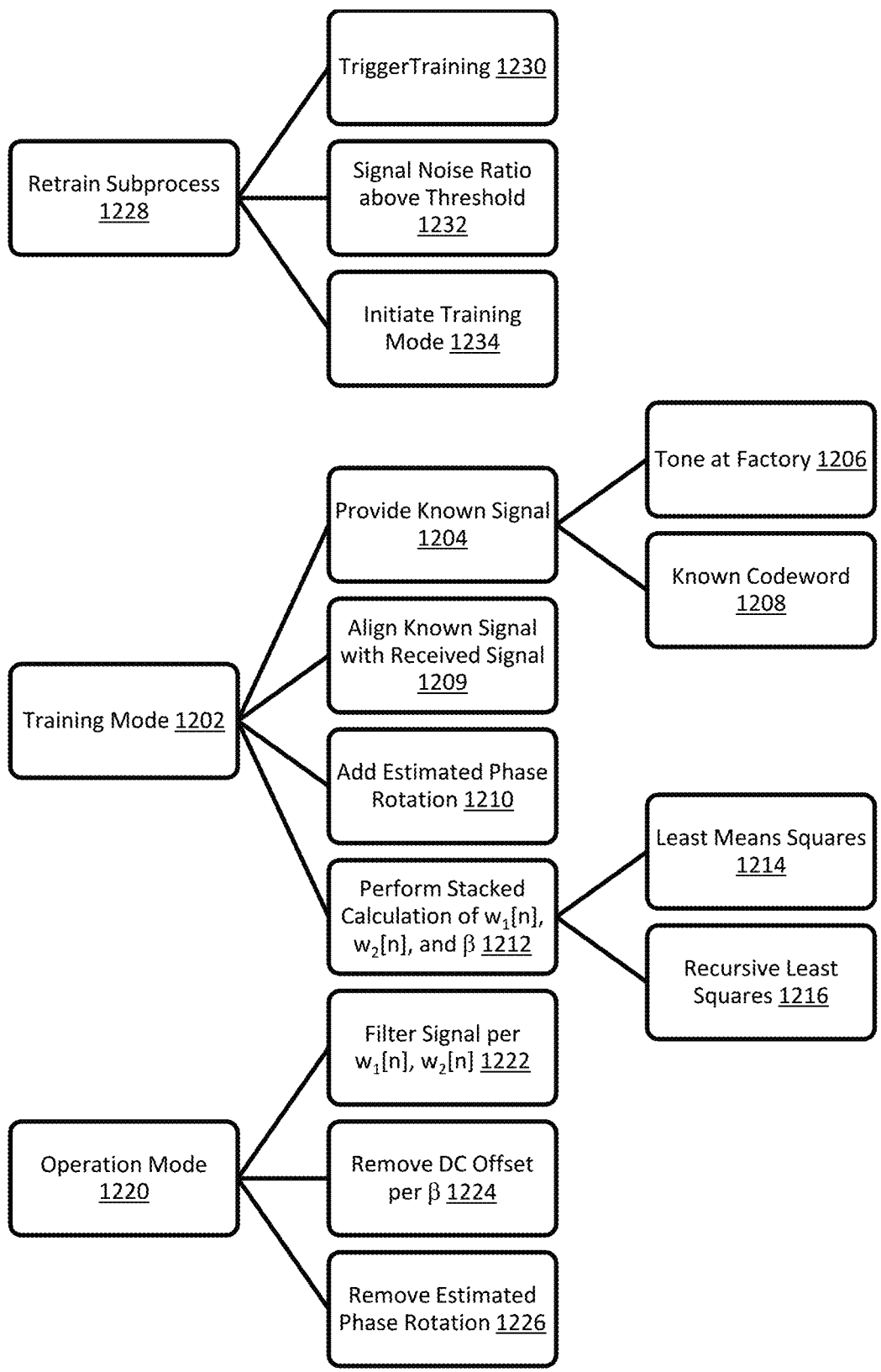
FIG. 12 illustrates a process for RFI compensation according to various embodiments.

FIG. 7 illustrates a representative transfer function of the compensation filters, $w_1[n]$ and $w_2[n]$, computed at the end of the proposed training mode, for example per FIG. 12. The compensation filters corrected for the signal linear distortion if present, as indicated by the 0 decibel (dB) error component, in a signal 702 in the frequency-band of interest. The compensation filters also provided a strong rejection, as indicated by the almost −60 decibel (dB) null, of an image signal 704 in the frequency-band of interest.

Figure 8A:
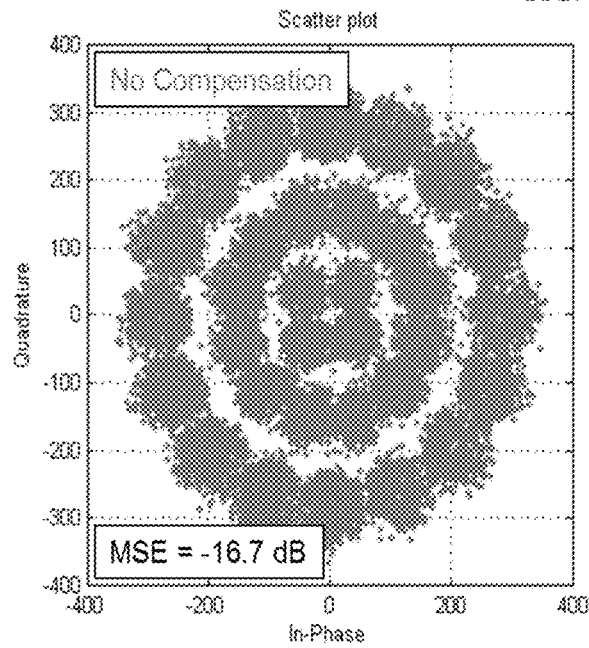
FIG. 8A illustrates a noiseless scatter plot of an output of a receive Root-Raised Cosine (RRC) filter without a RFI compensator according to various embodiments.
Figure 8B:
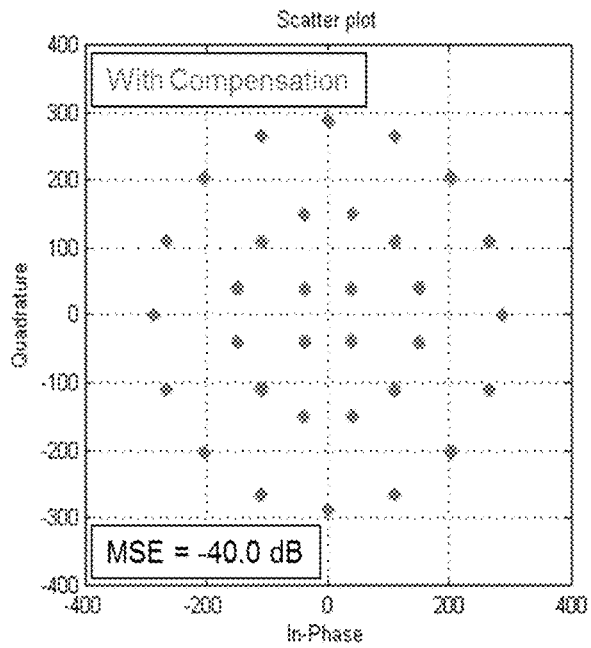
FIG. 8B illustrates a noiseless scatter plot of an output of a receive RRC filter with an RFI compensator according to various embodiments.

FIG. 8A illustrates a noiseless scatter plot of an output of a receive Root-Raised Cosine (RRC) filter without a RFI compensator according to various embodiments. FIG. 8B illustrates a noiseless scatter plot of an output of a receive RRC filter with an RFI compensator according to various embodiments.

FIG. 8A and FIG. 8B show noiseless scatterplots at the output of a receive RRC filter, with and without respectively, the RFI compensator of the present teachings. FIG. 8A illustrates that the results without the RFI compensator are unsatisfactory, per the more diffuse plotting, or clustering, of data points in FIG. 8A versus FIG. 8B, with distortion level at −16.7 dB, causing a performance error floor. In contrast, the RFI compensator used 13 taps in each arm and reduced the MSE by more than 23 dB, essentially completely restoring IQ balance and suppressing DC offset in the presence of unavoidable frequency error.

FIG. 9 illustrates a simulated Mean Squared Error (MSE) at $E_s/N_0$=15 dB with and without an RFI compensator according to various embodiments.

FIG. 9 reports the performance when Additive White Gaussian Noise (AWGN) contaminates the input r(t) of the quadrature-conversion architecture in FIG. 1. The Signal-to-Noise Ratio (SNR) is denoted as Es/N0, where Es is signal symbol energy and N0 is the one-sided power spectral density level of the background noise. The levels of SNR are set at 33 dB for training and 15 dB during normal operation. The 15 dB value is typical during normal mode when employing 32 APSK constellation based on the DVB-S2X satellite standard. FIG. 10 compares the simulated performance in terms of MSE at the output of receive RRC filter with and without the proposed RFI compensator. Simulations indicate significant improvement relative to systems not using the present teachings, with improvements of more than 2 dB when using only 13 taps in each arm. Further, the present teachings completely and jointly remove the distortions resulting from unavoidable analog RF impairments. These impairments include the frequency-independent IQ imbalance from the gain and phase mismatch of the LO mixer, frequency selective IQ imbalance from the analog filters, and DC offset from LO carrier leakage. This excellent performance is maintained even in the presence of frequency error of 4 MHz.

The present teachings may be used at the transmitter and/or at the receiver. In broadband satellite applications, a RFI compensator that accounts for the RF impairments may typically be located at a remote receiver. The present teachings are adaptive and do not require a priori knowledge about the RF impairments impulse response. They operate as data-aided at the factory where known signal ž[n] uses known training data during initial calibration. They can also operate in a decision-directed mode during normal operation to continuously track component variations due to temperature and aging, without sending training data at a gateway from a remote terminal. Instead, the known signal ž[n] in normal mode may use reliable sample estimates generated by the demodulation process itself.

FIG. 10 illustrates a signal demodulation including an RFI compensator according to various embodiments.

A receiver 1000 may include a tuner 1002 to receive an RF signal at a carrier frequency $f_c$. The RF signal is provided to an Analog to Digital Converter (ADC) 1104, whose output is provided to an RFI compensator 1006. The output of the RFI compensator 1006 is provided to a demodulator 1008 to obtain a demodulated signal.

FIG. 11A illustrates a multi-carrier signal demodulation including a plurality of RFI compensators according to various embodiments.

A receiver 1100 may include a tuner 1102 to receive an RF signal at a carrier frequency $f_c$. The RF signal may be a multi-carrier signal including N signals having a carrier frequency of $f_1$ to $f_N$. The RF signal is provided to an Analog to Digital Converter (ADC) 1104, whose output is provided to N RFI compensators 1106. Outputs of the N RFI compensators 1106 are provided to N mixers 1110 to recover signals modulated at carrier frequencies from $f_1$ to $f_N$. The signals modulated at carrier frequencies $f_1$ to $f_N$ are provided to N demodulators 1108 to obtain N demodulated signals. In some embodiments, the N RFI compensators 1106 are separately trained relative to the individual carriers. In some embodiments, the N separately trained RFI compensators 1106 are trained with different frequency errors $\delta_f$.

Figure 11B:
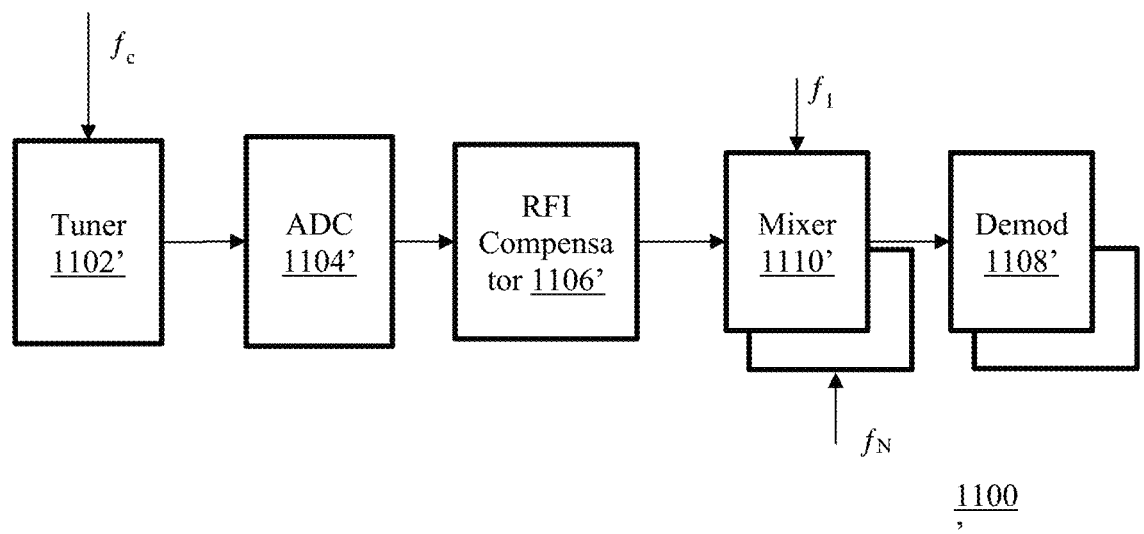
FIG. 11B illustrates a multi-carrier signal demodulation including an RFI compensator according to various embodiments.

FIG. 11B illustrates a multi-carrier signal demodulation including an RFI compensator according to various embodiments.

A receiver 1100' may include a tuner 1102' to receive an RF signal at a carrier frequency $f_c$. The RF signal may be a multi-carrier signal including N signals having a carrier frequency of $f_1$ to $f_N$. The RF signal is provided to an Analog to Digital Converter (ADC) 1104', whose output is provided to an RFI compensator 1106'. An output of the RFI compensator 1106' is provided to N mixers 1110' to recover signals modulated at carrier frequencies from $f_1$ to $f_N$. The signals modulated at carrier frequencies $f_1$ to $f_N$ are provided to N demodulators 1108' to obtain N demodulated signals. In some embodiments, the RFI compensator 1106' is trained relative to a wide frequency band that includes frequency bands of the N signals having the carrier frequencies of $f_1$ to $f_N$. In some embodiments, the RFI compensator 1106' is trained relative to a wide frequency band that includes a single wideband carrier. In some embodiments, the RFI compensator 1106' trained with a frequency error $\delta_f$ for the wide frequency band.

FIG. 12 illustrates a process for RFI compensation according to various embodiments.

A RFI compensation process 1200 for RFI compensation may include a retrain subprocess 1228, a training mode 1202 and an operation mode 1220.

The retrain subprocess 1228 may be used after deployment to train an RFI compensator as needed. For example, the retrain subprocess 1228 can be triggered at operation 1230, The triggering may be in response to an elapsed time since last training exceeding a threshold, receiving a predefined header from a transmitter such as a gateway, provisioning, initialization, or the like. In some embodiments, a header may include a Physical Layer Signaling (PLS) code. The PLS code may be defined by a standard, such as, the DVB-S2 or DVB-S2X standard. In some embodiments, training of the RFI compensator may not be desired during signal fade. The retrain subprocess 1228 may check that a Signal-to-Noise Ratio (SNR) of a received signal is above a SNR threshold at operation 1232 before initiating a training mode at operation 1234.

The training mode 1202 depends on having a known signal as a reference signal, such as signal $\tilde{z}[n]$ of FIG. 4. The RFI compensation process 1200 includes providing a known signal at operation 1204. The known signal may include a tone at a factory 1206 or extracting a known codeword 1208 with a fixed signal at deployment. In exemplary embodiments, the known codeword 1208 may include a signal per a standard, such as, the DVB-S2 or DVB-S2X standard.

In training mode 1202 (see FIG. 4), the known signal and a received signal, such as signal $\tilde{x}[n]$ of FIG. 4, may then be aligned per operation 1209. The operation 1209 may align the known signal with the received signal for time, phase, gain or the like. After alignment, the RFI compensation process 1200 may add an estimated phase rotation 1210 to the known signal. The known and received signals are used to perform a stacked calculation of $w_1[n]$, $w_2[n]$, and optionally $\beta$ at operation 1212 to obtain an RFI compensated signal, such as signal $\tilde{y}[n]$ of FIG. 4. Operation 1212 may be performed using known filter methods such as Least Mean Squares at operation 1214, or Recursive Least Squares at operation 1216 to drive a difference/error ($e[n]$ of FIG. 4) between the known signal and the RFI compensated signal to zero.

In operation mode 1220 (see FIG. 3), the RFI compensation process 1200 includes filtering a received signal per $w_1[n]$, $w_2[n]$ at operation 1222. The RFI compensation process 1200 includes removing a DC Offset per $\beta$ at operation 1224. The RFI compensation process 1200 includes removing an estimated phase rotation at operation 1226.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim as my invention:

1. A Radio Frequency Impairments (RFI) compensator comprising:
    a conjugator to conjugate a signal $\tilde{x}[n]$ to provide a signal $\tilde{x}^*[n]$;
    a filter to apply coefficients that equalize a linear distortion of the signal $\tilde{x}[n]$, and reject an interfering image of the signal $\tilde{x}^*[n]$;
    a known signal $\tilde{z}[n]$ represents a baseband signal without an in-phase/quadrature (IQ) imbalance; and
    a coefficient calculator to calculate coefficients for the filter based on the known signal $\tilde{z}[n]$ and the signal $\tilde{x}[n]$, wherein the coefficients are based on the coefficients,
    wherein the coefficient calculator modifies the signal $\tilde{x}[n]$ with the coefficients to generate a signal $\tilde{y}[n]$ and iteratively calculates the coefficients to drive a difference between the known signal $\tilde{z}[n]$ and the signal $\tilde{y}[n]$ to zero.

2. The RFI compensator of claim 1, further comprising a complex mixer to remove an estimated frequency error $e^{j2\pi\delta_f nT_s}$ from an output of the filter.

3. The RFI compensator of claim 1, further comprising an adder to add a voltage offset $\beta$ to an output of the filter; and a complex mixer to remove an estimated frequency error $e^{j2\pi\delta_f nT_s}$ from an adder output.

4. The RFI compensator of claim 1, wherein the coefficient calculator calculates a voltage offset $\beta$.

5. The RFI compensator of claim 1, wherein the coefficient calculator uses one or more of a Least Mean-Squares (LMS) technique or a Recursive Least-Squares (RLS) technique.

6. The RFI compensator of claim 1, further comprising a complex mixer to add an estimated frequency error $e^{j2\pi\delta_f nT_s}$ to the known signal $\tilde{z}[n]$.

7. The RFI compensator of claim 1, wherein the known signal comprises a reliable sample estimate generated by a demodulation.

8. A process to compensate for Radio Frequency Impairments (RFI), the process comprising:
    conjugating a signal $\tilde{x}[n]$ to provide a signal $\tilde{x}^*[n]$;
    filtering by applying coefficients that equalize a linear distortion of the signal $\tilde{x}[n]$ and reject an interfering image of the signal $\tilde{x}^*[n]$;
    providing a known signal $\tilde{z}[n]$ represents a baseband signal without an in-phase/quadrature (IQ) imbalance; and
    calculating coefficients for the filtering based on the known signal $\tilde{z}[n]$ and the signal $\tilde{x}[n]$,
    wherein the calculating comprises modifying the signal $\tilde{x}[n]$ with the coefficients to generate a signal $\tilde{y}[n]$ and iteratively calculating the coefficients to drive a difference between the known signal $\tilde{z}[n]$ and the signal $\tilde{y}[n]$ to zero.

9. The process of claim 8, further comprising removing an estimated frequency error $e^{j2\pi\delta_f nT_s}$ from an output of the filtering.

10. The process of claim 8, further comprising adding a voltage offset $\beta$ to an output of the filtering; and removing an estimated frequency error $e^{j2\pi\delta_f nT_s}$ from an adding output.

11. The process of claim 8, wherein the calculating calculates a voltage offset $\beta$.

12. The process of claim 8, wherein the calculating comprises using one or more of a Least Mean-Squares (LMS) technique or a Recursive Least-Squares (RLS) technique.

13. The process of claim 8, further comprising adding an estimated frequency error $e^{j2\pi\delta_f nT_s}$ to the known signal $\tilde{z}[n]$.

14. The process of claim 8, wherein the known signal comprises a reliable sample estimate generated by a demodulation.

* * * * *